United States Patent
Kuwatsuka et al.

(10) Patent No.: US 6,710,151 B2
(45) Date of Patent: Mar. 23, 2004

(54) TERMINAL-BLOCKED ISOCYANATE PREPOLYMER HAVING OXADIAZINE RING, PROCESS FOR PRODUCING THE SAME, AND COMPOSITION FOR SURFACE-COATING MATERIAL

(75) Inventors: Toshiaki Kuwatsuka, Sodegaura (JP); Hideaki Ogata, Sodegaura (JP); Manabu Shimoda, Sodegaura (JP); Ryuuji Haseyama, Sodegaura (JP); Izumi Mega, Sodegaura (JP)

(73) Assignee: Mitsui Chemicals, Inc., Tokyo (JP)

( * ) Notice: Subject to any disclaimer, the term of this patent is extended or adjusted under 35 U.S.C. 154(b) by 0 days.

(21) Appl. No.: 10/275,901
(22) PCT Filed: Mar. 20, 2002
(86) PCT No.: PCT/JP02/02673
§ 371 (c)(1), (2), (4) Date: Nov. 12, 2002
(87) PCT Pub. No.: WO02/077054
PCT Pub. Date: Oct. 3, 2002

(65) Prior Publication Data
US 2003/0162930 A1 Aug. 28, 2003

(30) Foreign Application Priority Data
Mar. 21, 2001 (JP) .......... 2001-79713
Oct. 12, 2001 (JP) .......... 2001-315052

(51) Int. Cl.⁷ .......... C08G 18/79; C08G 18/80; C09D 175/04; C08L 75/04; C07D 273/04
(52) U.S. Cl. .......... 528/45; 252/182.2; 252/182.21; 252/188.22; 525/124; 525/127; 525/128; 525/131; 525/440; 525/454; 525/455; 525/458; 528/59; 528/60; 528/65; 528/66; 528/67; 528/73; 544/67; 544/68; 560/24; 560/25; 560/115; 560/157; 560/158; 560/336; 560/354; 560/355
(58) Field of Search .......... 252/182.2, 182.21, 252/182.22; 525/124, 127, 128, 131, 440, 454, 455, 458; 528/45, 59, 60, 65, 66, 67, 73; 544/67, 68; 560/24, 25, 115, 157, 158, 336, 354, 355

(56) References Cited

U.S. PATENT DOCUMENTS

| 4,443,597 A | 4/1984 | Kamatani et al. ......... 544/67 |
| 4,448,947 A * | 5/1984 | Miyake et al. .......... 528/73 |
| 4,456,744 A * | 6/1984 | Kamatani et al. ......... 528/71 |
| 4,471,103 A * | 9/1984 | Miyake et al. .......... 528/65 |
| 4,474,934 A | 10/1984 | Tanaka et al. .......... 528/45 |
| 4,546,153 A | 10/1985 | Kamatani et al. ......... 525/453 |
| 4,595,741 A | 6/1986 | Kamatani et al. ......... 528/53 |
| 4,869,965 A | 9/1989 | Gerum et al. .......... 427/128 |
| 5,777,061 A * | 7/1998 | Yonek et al. .......... 528/45 |
| 5,917,083 A | 6/1999 | Konig et al. .......... 560/157 |

FOREIGN PATENT DOCUMENTS

| JP | 45-35314 | 11/1970 |
| JP | 57-9773 A | 1/1982 |
| JP | 58-96658 A | 6/1983 |
| JP | 58-101175 A | 6/1983 |
| JP | 60-115615 A | 6/1985 |
| JP | 60-206820 A | 10/1985 |
| JP | 63-193327 A | 8/1988 |
| JP | 10-87600 A | 4/1998 |
| JP | 2000-290269 A | 10/2000 |

* cited by examiner

Primary Examiner—Rabon Sergent
(74) Attorney, Agent, or Firm—Burns Doane, Swecker & Mathis, LLP

(57) ABSTRACT

The end-blocked isocyanate prepolymer having an oxadiazine ring according to the present invention is characterized in that at least one of isocyanate groups of a NCO-terminated isocyanate prepolymer, which has NCO groups at the ends and comprises units derived from an oxadiazinetrione compound (A) represented by the following formula (1) and units derived from an active hydrogen compound (B) represented by the following formula (2), is blocked with a unit derived from an end-blocking agent (C) having at least one active hydrogen in one molecule, and that the end-blocked isocyanate prepolymer has a softening point of not lower than 50° C.,

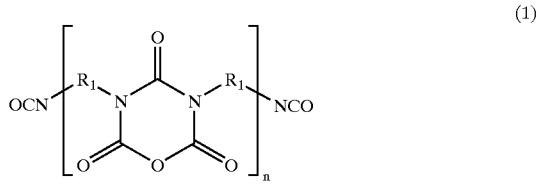

(1)

wherein $R_1$ is a group selected from the group consisting of an aliphatic hydrocarbon group of 2 to 20 carbon atoms, an aliphatic hydrocarbon group having an aromatic group and an alicyclic hydrocarbon group, and n is an integer of 1 or greater, $$H-A-R_2-A-H \quad (2)$$

wherein $R_2$ is a straight-chain, branched or cyclic alkylene group of 2 to 12 carbon atoms, and A is any one of an oxygen atom, a sulfur atom, a N—R' group (R' is a hydrogen atom, an alkyl group, an aryl group or an aralkyl group) and a COO group.

20 Claims, No Drawings

TERMINAL-BLOCKED ISOCYANATE PREPOLYMER HAVING OXADIAZINE RING, PROCESS FOR PRODUCING THE SAME, AND COMPOSITION FOR SURFACE-COATING MATERIAL

FIELD OF THE INVENTION

The present invention relates to an end-blocked isocyanate prepolymer that is preferable for a surface coating material, especially a powder coating material, a composition containing the end-blocked isocyanate prepolymer, and a process for preparing the end-blocked isocyanate prepolymer. More particularly, the invention relates to a novel end-blocked isocyanate prepolymer having an oxadiazine ring, a composition for a surface coating material, which contains the prepolymer, and a process for preparing the prepolymer.

BACKGROUND OF THE INVENTION

Blocked polyisocyanates wherein the isocyanate groups are previously reacted with an active hydrogen compound in order to maintain the isocyanate groups in an inert state until the reaction is initiated are publicly known. For example, the conventional information is collected in "Progress in Organic Coatings" 36(1999), 148–172, etc. The blocked polyisocyanates mentioned above have been widely used as curing agents for powder coating materials.

Since the quantity of VOC (volatile organic compounds) released from such powder coating materials is small, use of the powder coating materials is recently extending all over the world as environmentally low-burdening coating materials instead of the conventional solvent type coating materials.

The conventional blocked polyisocyanates, however, use VOC such as ε-caprolactam as a blocking agent, and the blocking agent dissociated in the course of the reaction is released as VOC into the environment directly or indirectly, so that further decrease of the VOC has been desired. Moreover, there has been presented a problem that the blocking agent such as ε-caprolactam volatilizes in the curing stage to cause resinous stain on the inside of the curing oven and this causes yellowing of the resulting coating film.

In order to solve the above problems, many uretdione curing agents (internally blocked isocyanates) have been reported (e.g., Japanese Patent Publication No. 29705/1985, Japanese Patent Laid-Open Publication No. 70761/1976, Japanese Patent Laid-Open Publication No. 64676/1982, Japanese Patent Laid-Open Publication No. 16090/1989, Japanese Patent Laid-Open Publication No. 188737/1997). In order to form good coating films, however, the uretdione curing agents need higher curing temperatures than the conventional blocked polyisocyanates (e.g., Japanese Patent Laid-Open Publication No. 46055/1998, Japanese Patent Laid-Open Publication No. 279450/1999), so that the energy consumption becomes large, and hence it cannot be said that they are environmentally low-burdening. Although various means to solve such problems have been studied, there still remain many practical problems.

On the other hand, diisocyanates having oxadiazinetrione ring structure, high-molecular weight or low-molecular weight glycols, and oligomers prepared by the use of an end-blocking material are also known. Under the conventional reaction conditions (use of reaction catalyst such as dibutyltin dilaurate, see Japanese Patent Laid-Open Publication No. 193327/1988, Japanese Patent Laid-Open Publication No. 206820/1985, Japanese Patent Laid-Open Publication No. 115615/1985 and Japanese Patent Laid-Open Publication No. 9773/1982), however, ring-opening reaction of the oxadiazinetrione ring proceeds partially or wholly, and in either case, a three-dimensionally crosslinked urethane oligomer is formed. In this case, the resulting compound has no melting point, and its melt viscosity is extremely high, so that this compound cannot be used unless it is diluted with a solvent. The above-mentioned oligomers are also used in a dilute state with a solvent such as tetrahydrofuran, Cellosolve acetate or polyoxypropylene glycol, without being separated.

That is to say, such an isocyanate prepolymer having an oxadiazinetrione ring and exhibiting a melting point as described in this specification is a novel substance, and an example relating to use of the substance as a curing agent for a surface coating material, not to mention a curing agent for a powder coating material has been hitherto unknown.

It is known that the oxadiazinetrione ring readily reacts with a hydroxyl group-containing compound at room temperature in the presence of a catalyst (see Japanese Patent Laid-Open Publication No. 87600/1998). It is also known that the ring-opening reaction proceeds at a temperature of not lower than 120° C. (see Japanese Patent Publication No. 35314/1970, Japanese Patent Laid-Open Publication No. 96658/1983 and Japanese Patent Laid-Open Publication No. 193327/1988). According to the conventional information, therefore, it is difficult to carry out the control of the curing reaction within a narrow temperature region such that at the melt kneading temperature (100–140° C.) the oxadiazinetrione ring is maintained unreacted and at the curing temperature (160–200° C.) ring-opening reaction of the oxadiazinetrione ring is promoted.

It is an object of the present invention to provide a novel end-blocked isocyanate prepolymer which can remarkably decrease occurrence of a volatile component in the curing stage, has excellent film properties, shows excellent energy efficiency and is favorable for a surface coating material, and to provide a process for preparing the prepolymer. It is another object of the invention to provide a surface coating material using the end-blocked isocyanate prepolymer, such as a powder coating material, which is free from occurrence of a volatile component in the curing stage, has excellent film properties and shows excellent energy efficiency, and to provide a process for preparing the surface coating material.

DISCLOSURE OF THE INVENTION

The present inventors have focused attention that the oxadiazinetrione structure reacts with an active hydrogen compound such as a polyol similarly to a blocked polyisocyanate and releases only small amount of carbon dioxide that is non-VOC, and have earnestly studied to attain the above objects. As a result, the present inventors have found that a novel end-blocked isocyanate prepolymer having a specific structure can remarkably decrease the amount of the released VOC as compared with the conventional end-blocked polyisocyanates and exhibits excellent film properties. Based on the finding, the present invention has been accomplished.

The end-blocked isocyanate prepolymer having an oxadiazine ring according to the invention is a prepolymer wherein at least one of isocyanate groups of a NCO-terminated isocyanate prepolymer, which has NCO groups at the ends and comprises units derived from an oxadiazinetrione compound (A) represented by the following formula (1) and units derived from an active hydrogen compound (B) represented by the following formula (2), is blocked with a unit derived from an end-blocking agent (C) having at least one active hydrogen in one molecule, said end-blocked isocyanate prepolymer having a softening point of not lower than 50° C.,

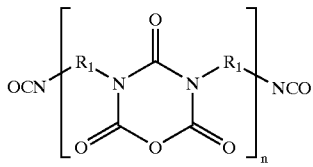

wherein $R_1$ is a group selected from the group consisting of an aliphatic hydrocarbon group of 2 to 20 carbon atoms, an aliphatic hydrocarbon group having an aromatic group and an alicyclic hydrocarbon group, and n is an integer of 1 or greater,

wherein $R_2$ is a straight-chain, branched or cyclic alkylene group of 2 to 12 carbon atoms, and A is any one of an oxygen atom, a sulfur atom, a N—R' group (R' is a hydrogen atom, an alkyl group, an aryl group or an aralkyl group) and a COO group.

The end-blocked isocyanate prepolymer having an oxadiazine ring according to the invention is a prepolymer obtained by allowing a NCO-terminated isocyanate prepolymer having NCO groups at the ends to react with an end-blocking agent (C) having at least one active hydrogen in one molecule, said NCO-terminated isocyanate prepolymer being obtained by allowing an oxadiazinetrione compound (A) represented by the following formula (1) to react with an active hydrogen compound (B) represented by the following formula (2), wherein at least one of isocyanate groups of the NCO-terminated isocyanate prepolymer is blocked with the end-blocking agent (C), said end-blocked isocyanate prepolymer having a softening point of not lower than 50° C.,

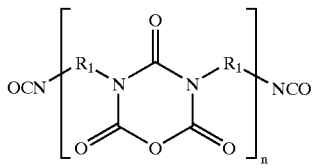

wherein $R_1$ is a group selected from the group consisting of an aliphatic hydrocarbon group of 2 to 20 carbon atoms, an aliphatic hydrocarbon group having an aromatic group and an alicyclic hydrocarbon group, and n is an integer of 1 or greater,

wherein $R_2$ is a straight-chain, branched or cyclic alkylene group of 2 to 12 carbon atoms, and A is any one of an oxygen atom, a sulfur atom, a N—R' group (R' is a hydrogen atom, an alkyl group, an aryl group or an aralkyl group) and a COO group.

The end-blocking agent (C) having active hydrogen is preferably at least one compound selected from the group consisting of oximes, amides, imides, active methylene compounds, amines, azoles, alcohols, phenols and thiols.

The end-blocked isocyanate prepolymer may partially contain, in its molecule, at least one skeleton selected from a uretdione structure, an isocyanurate structure, a carbodiimide structure, a biuret structure, a urea structure, a urethane structure, an allophanate structure and a uretnimine structure.

The curing agent for a surface coating material according to the invention contains the above-mentioned end-blocked isocyanate prepolymer.

The curing agent for a powder coating material according to the invention contains the above-mentioned end-blocked isocyanate prepolymer.

The composition for a surface coating material according to the invention contains the above-mentioned end-blocked isocyanate prepolymer and a polymer having at least two hydroxyl groups in the molecule.

The composition for a powder coating material according to the invention contains the above-mentioned end-blocked isocyanate prepolymer and a polymer having at least two hydroxyl groups in the molecule.

The polymer having hydroxyl groups is preferably at least one polyol selected from the group consisting of acrylic polyols, polyester polyols, polyether polyols, urethane polyols, epoxy polyols and polycarbonate polyols.

The composition for a surface coating material preferably contains as a curing catalyst at least one compound selected from the group consisting of metallic compounds, salts of organic bases and imidazoles.

The composition for a powder coating material preferably contains as a curing catalyst at least one compound selected from the group consisting of metallic compounds, salts of organic bases and imidazoles.

The process for preparing an end-blocked isocyanate prepolymer according to the invention comprises allowing a NCO-terminated isocyanate prepolymer having NCO groups at the ends to react with an end-blocking agent (C) having at least one active hydrogen in one molecule substantially in the absence of a catalyst, said NCO-terminated isocyanate prepolymer being obtained by allowing an oxadiazinetrione compound (A) represented by the following formula (1) to react with an active hydrogen compound (B) represented by the following formula (2) substantially in the absence of a catalyst, to obtain an end-blocked isocyanate prepolymer wherein at least one of isocyanate groups of the NCO-terminated isocyanate prepolymer is blocked with the end-blocking agent (C), said end-blocked isocyanate prepolymer having a softening point of not lower than 50° C.,

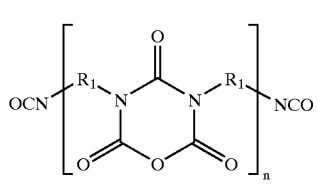

wherein $R_1$ is a group selected from the group consisting of an aliphatic hydrocarbon group of 2 to 20 carbon atoms, an aliphatic hydrocarbon group having an aromatic group and an alicyclic hydrocarbon group, and n is an integer of 1 or greater,

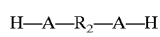

wherein $R_2$ is a straight-chain, branched or cyclic alkylene group of 2 to 12 carbon atoms, and A is any one of an oxygen atom, a sulfur atom, a N—R' group (R' is a hydrogen atom, an alkyl group, an aryl group or an aralkyl group) and a COO group.

The oxadiazinetrione compound (A) represented by the formula (1) is preferably a compound obtained by allowing at least one diisocyanate selected from the group consisting of norbornane diisocyanate (NBDI), hydrogenated xylylene diisocyanate (hydrogenated XDI), xylylene diisocyanate (XDI), hexamethylene diisocyanate (HDI), tricyclodecane diisocyanatomethyl (TCDI), isophorone diisocyanate (IPDI), hydrogenated MDI and cyclohexane diisocyanate (CHDI) to react with carbon dioxide.

PREFERRED EMBODIMENTS OF THE INVENTION

End-blocked Isocyanate Prepolymer

The end-blocked isocyanate prepolymer having an oxadiazinetrione ring according to the invention is a prepolymer wherein at least one of isocyanate groups of a NCO-terminated isocyanate prepolymer, which comprises units derived from an oxadiazinetrione compound (A) represented by the following formula (1) and units derived from an active hydrogen compound (B) represented by the following formula (2), is blocked with a unit derived from an end-blocking agent (C) having at least one active hydrogen in one molecule, said end-blocked isocyanate prepolymer having a softening point of not lower than 50° C.

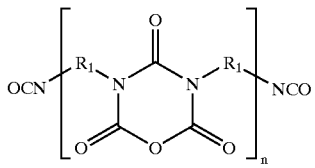

(1)

H—A—$R_2$—A—H    (2)

The NCO-terminated isocyanate prepolymer has at least one isocyanate group at the end of the main skeleton.

The oxadiazinetrione compound (A) represented by the formula (1), the active hydrogen compound (B) represented by the formula (2), the end-blocking agent (C) having at least one active hydrogen in one molecule, the NCO-terminated isocyanate prepolymer, the end-blocked isocyanate prepolymer, and the process for preparing the same are described in detail hereinafter.

Oxadiazinetrione Compound (A)

The oxadiazinetrione compound (A) for deriving the end-blocked isocyanate prepolymer of the invention is represented by the following formula (1).

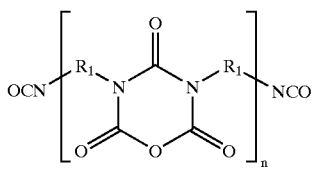

(1)

In the formula (1), $R_1$, is a group selected from the group consisting of an aliphatic hydrocarbon group of 2 to 20 carbon atoms, an aliphatic hydrocarbon group having an aromatic group and an alicyclic hydrocarbon group, and n is an integer of 1 or greater. In one molecule, hydrocarbon groups which are selected from the above hydrocarbon groups and are different from each other may be contained.

It is desirable that n is usually not less than 1 and not more than 10, preferably not less than 1 and not more than 5, particularly preferably not less than 1 and not more than 3.

The aliphatic hydrocarbon group of 2 to 20 carbon atoms is preferably an aliphatic hydrocarbon group of 4 to 16 carbon atoms, more preferably that of 6 to 14 carbon atoms, and examples thereof include units derived from n-hexane diisocyanate, heptane diisocyanate, nonane diisocyanate and trimethylhexane diisocyanate. Of these, preferable are units derived from n-hexane diisocyanate, 2,2,4-trimethylhexane diisocyanate and 2,4,4-trimethylhexane diisocyanate.

The aliphatic hydrocarbon group having an aromatic group is preferably an aliphatic hydrocarbon group of 8 to 16 carbon atoms, more preferably that of 8 to 14 carbon atoms, and examples thereof include units derived from xylylene diisocyanate and tetramethylxylylene diisocyanate. Of these, preferable are units derived from xylylene diisocyanate etc.

The alicyclic hydrocarbon group is preferably an alicyclic hydrocarbon group of 4 to 16 carbon atoms, more preferably that of 6 to 14 carbon atoms, and examples thereof preferably include units derived from bis(isocyanatomethyl)cyclohexane, norbornane diisocyanate, methylenebiscyclohexyl isocyanate, isophorone diisocyanate and tricyclodecane diisocyanate. Of these, preferable are units derived from bis(isocyanatomethyl)cyclohexane, norbornane diisocyanate and tricyclodecane diisocyanate.

Of the above units, preferable in the invention are units derived from n-hexane diisocyanate, 2,2,4-trimethylhexane diisocyanate, 2,4,4-trimethylhexane diisocyanate, xylylene diisocyanate, bis(isocyanatomethyl)cyclohexane and norbornane diisocyanate, and particularly preferable in the invention are units derived from n-hexane diisocyanate, xylylene diisocyanate, bis(isocyanatomethyl)cyclohexane and norbornane diisocyanate.

When the oxadiazinetrione compound having the above group as $R_1$, is used, the resulting end-blocked isocyanate prepolymer exhibits an appropriate softening point such as not lower than 50° C., and a cured product having excellent curing properties and film properties can be obtained.

The oxadiazinetrione compounds (A) mentioned above can be used singly or in combination of plural kinds which are different in the n value and/or $R_1$ each other.

Process for Preparing Oxadiazinetrione Compound

There is no specific limitation on the process for preparing the oxadiazinetrione compound, and for example, the oxadiazinetrione compound can be prepared by allowing an organic polyisocyanate compound having at least two isocyanate groups in the molecule to react with carbon dioxide, optionally in the presence of a catalyst, a solvent and other additives. It is preferable to carry out the reaction with carbon dioxide in the presence of a catalyst.

Carbon dioxide used for the reaction may be in any form provided that at least a part thereof can be dissolved in the reaction system. For example, a carbonic acid gas may be blown into the reaction system, or solid carbonic acid may be allowed to exist in the reaction system to perform the reaction. Further, a carbonic acid gas or a liquefied carbonic acid gas can be reacted under pressure in a pressure vessel.

It is preferable to carry out the reaction in an atmosphere of an inert gas such as nitrogen, helium or argon.

Although the reaction temperature varies depending upon the type of the catalyst, etc., it is in the range of usually −20 to +120° C., preferably −10 to +70° C.

Although the conversion or the like is not specifically restricted, it is preferable that immediately after the reaction of about 20 to 60% of the isocyanate groups present first is completed, a catalyst poison is added to deactivate the catalyst and to terminate the reaction, then the deactivated catalyst is removed from the reaction mixture when needed, and then the unreacted starting materials and the solvent used are removed. If necessary, the unreacted starting materials and the reaction solvent etc. can be partially removed by drawing out the gas phase from the reactor and subjecting it to condensation and circulation.

The progress of the reaction, such as conversion, can be traced by measuring the residual quantity of the unreacted starting materials through gas chromatography.

Although there is no specific limitation on the reaction apparatus etc., it is preferable to use a reactor equipped with a thermometer, and if necessary, with a gas inlet and a cooling tube and having been designed so that the reaction solution inside can be sufficiently stirred.

After the reaction is terminated, the unreacted starting materials, solvent, etc. can be removed by thin film distillation or solvent extraction. In this case, it is preferable to remove the unreacted diisocyanate in such a manner that the content of the unreacted diisocyanate in the aimed product becomes not more than about 1% by mass (wt %).

Organic Polyisocyanate

The organic polyisocyanate for use in the preparation of the oxadiazinetrione compound is, for example, an aliphatic organic polyisocyanate, an aliphatic organic polyisocyanate having an aromatic group, an alicyclic organic polyisocyanate or an alicyclic organic polyisocyanate having an aromatic group. These organic polyisocyantes may be used singly or in combination of plural kinds.

Examples of the aliphatic organic polyisocyanates include tetramethylene diisocyanate, pentamethylene diisocyanate, hexamethylene diisocyanate (HDI), 2-methyl-1,5-diisocyanate pentane (MPDI), trimethyldiisocyanate hexane (TMDI), nonane diisocyanate and the like.

Examples of the aliphatic organic polyisocyanates having an aromatic group (i.e., aliphatic organic polyisocyanates having aromatic group on the side chain) include xylylene diisocyanate (XDI) and the like.

The alicyclic organic polyisocyanate may be polycyclic type or monocyclic type, and examples thereof include hydrogenated xylylene diisocyanate (hydrogenated XDI), norbornane diisocyanate (NBDI), tricyclodecane diisocyanatomethyl (TCDI), isophorone diisocyanate (IPDI), dicyclohexylmethane diisocyanate (hydrogenated MDI), cyclohexane diisocyanate (CHDI) and the like.

Of these, preferable is at least one diisocyanate selected from the group consisting of norbornane diisocyanate (NBDI), hydrogenated xylylene diisocyanate (hydrogenated XDI), xylylene diisocyanate (XDI), hexamethylene diisocyanate (HDI), tricyclodecane diisocyanatomethyl (TCDI), isophorone diisocyanate (IPDI), hydrogenated MDI and cyclohexane diisocyanate (CHDI). Of these, particularly preferable is hexamethylene diisocyanate (HDI), xylylene diisocyanate (XDI), hydrogenated xylylene diisocyanate (hydrogenated XDI), norbornane diisocyanate (NBDI) or the like.

As an isomer of the norbornane diisocyanate, any isomer is employable, but preferable is 2,5-diisocyanate methylbicyclo[2.2.1]heptane, 2,6-diisocyanate methylbicyclo[2.2.1]heptane or a mixture thereof.

Catalyst for the Preparation of Oxadiazinetrione Compound

The catalyst for use in the synthesis of the oxadiazinetrione compound is particularly preferably a tertiary phosphorus compound, such as triethylphosphine, tri-n-butylphosphine, dimethylphenylphosphine, diethylcyclohexylphosphine, 1-ethylphosphorane or 1-n-butylphosphorinane.

Although the amount of the catalyst used varies depending upon the type of the catalyst, the reaction conditions, etc., it is preferable to use the catalyst in an amount of about 0.001 to 10% by mass (wt %), particularly about 0.01 to 3% by mass (wt %), based on the organic polyisocyanate.

Solvent for the Preparation of Oxadiazinetrione Compound

In the reaction for preparing the oxadiazinetrione compound, a solvent may be used or does not necessarily need to be used. When a solvent is used, the solvent is preferably one having no reactivity to the isocyanate group. Examples of such solvents include cyclohexane, toluene, ethyl acetate, methyl ethyl ketone, tetrahydrofuran, Cellosolve acetate and the like.

The solvent may be added from the initial stage of the reaction. If the viscosity of the reaction solution is increased by the progress of the reaction, the solvent can be added in the course of the reaction according to necessity.

Catalyst Poison for the Preparation of Oxadiazinetrione Compound

The catalyst poison that is added when the desired conversion is reached by the reaction is, for example, bromoacetic ester, trichloroacetic acid, cyanoacetic ester, dimethyl sulfate, benzoyl chloride or acetyl chloride etc. The catalyst poison may be added in any amount provided that the amount is enough to terminate the reaction, but the amount of the catalyst poison is preferably in the range of 1.0 to 1.5 times the equivalent amount to neutralize the catalyst.

Active Hydrogen Compound (B)

The active hydrogen compound (B) is a compound represented by the following formula (2).

$$\text{H—A—R}_2\text{—A—H} \tag{2}$$

In the formula (2), $R_2$ is a straight-chain, branched or cyclic alkylene group of 2 to 12 carbon atoms, and A is any one of an oxygen atom, a sulfur atom, a N—R' group and a COO group. R' of the N—R' group is a hydrogen atom, an alkyl group, an aryl group or an aralkyl group. A is preferably an oxygen atom.

$R_2$ is preferably a straight-chain, branched or cyclic alkylene group of 2 to 12 carbon atoms. Examples of such groups include an ethanediyl group, a propanediyl group, a butanediyl group, a pentanediyl group, a hexanediyl group, a dodecanediyl group and a nonanediyl group.

Examples of the active hydrogen compounds (B) include compounds employable for the preparation of usual polyurethane prepolymers, such as polyols, dithiols and dicarboxylic acids. Of these, polyols, dithiols or dicarboxylic acids are preferably used. Of these, polyols are more preferably used, and diols are particularly preferably used. These compounds may be used singly or in combination of plural kinds.

Examples of the diols include ethylene glycol, propanediol, butanediol, pentanediol, dimethylpropanediol, neopentyl glycol, hexanediol, methylpentanediol, nonanediol, dodecanediol and the like. These diols may be used singly or in combination of plural kinds.

Examples of the dithiols include 1,2-ethanedithiol, 1,6-hexanedithiol, polyether polythiol, polyester polythiol and the like.

Examples of the dicarboxylic acids include succinic acid, adipic acid, sebacic acid, terephthalic acid, carboxyl group-terminated plybutadiene and the like.

Of these, adipic acid is preferably used.

The active hydrogen compounds (B) mentioned above may be used singly or in combination of plural kinds.

End-blocking Agent (C)

As the end-blocking agent (C) used for preparing the end-blocked isocyanate prepolymer having an oxadiazine ring according to the invention, a compound having at least one active hydrogen in the molecule is employable.

Examples of such compounds include oximes, amides, active methylene compounds, azoles, alcohols, phenols, amines and the like.

Examples of the oximes include acetone oxime, methyl ethyl ketone oxime, ethyl isopropyl ketone oxime, methyl isobutyl ketone oxime, cyclohexanone oxime and the like.

Examples of the amides include caprolactam, methylacetamide, acetanilide and the like.

Examples of the active methylene compounds include dimethyl malonate, diethyl malonate, methyl cyanoacetate, ethyl cyanoacetate and the like.

Examples of the alcohols include monools, such as methanol, ethanol, propanol, butanol, hexanol, cyclohexanol, ethylhexanol and benzyl alcohol; diols, such as ethylene glycol, propylene glycol, butanediol, pentanediol, hexanediol, neopentyl glycol, methylpentanediol, nonanediol and dodecanediol; and triols, such as glycerol and trimethylolpropane.

Examples of the phenols include phenol and the like.

Examples of the amines include diisopropylamine, dibutylamine and the like.

Of these, dibutylamine can be preferably used.

The end-blocking agents (C) mentioned above can be used singly or in combination of plural kinds.

Process for Peparing End-blocked Isocyanate Prepolymer

The end-blocked isocyanate prepolymer according to the invention is an end-blocked isocyanate prepolymer obtained by allowing a NCO-terminated isocyanate prepolymer, which is obtained by the reaction of the oxadiazinetrione compound (A) with the active hydrogen compound (B), to react with the end-blocking agent (C). In this end-blocked isocyanate prepolymer, at least one of isocyanate groups of the NCO-terminated isocyanate prepolymer is blocked with a unit derived from the end-blocking agent (C), and the end-blocked isocyanate prepolymer has a softening point of not lower than 50° C.

First, the process for preparing the NCO-terminated isocyanate prepolymer is described.

Process for Preparing NCO-terminated Isocyanate Prepolymer

Although the process for preparing the NCO-terminated isocyanate prepolymer is not specifically restricted, the prepolymer can be readily obtained by allowing the oxadiazinetrione compound (A) to react with the active hydrogen compound (B) optionally in the presence of additives such as a solvent. A typical example of the process for preparing the NCO-terminated isocyanate prepolymer is described below.

The oxadiazinetrione compound (A) and the active hydrogen compound (B) are desirably used in such amounts that the ratio (OH/NCO) of the active hydrogen in the active hydrogen compound (B) to the NCO group of the oxadiazinetrione compound (A) becomes usually 0.3 to 1.2 mol equivalents, preferably 0.5 to 1.0 mol equivalent.

When the above mol equivalent ratio is used, a cured product having excellent curing properties and film properties can be obtained.

It is desirable to set the reaction temperature in the range of usually 5 to 150° C.

In this reaction, it is preferable to substantially use no catalyst. By conducting the reaction without using a catalyst, ring-opening reaction of the oxadiazinetrione ring can be actually inhibited.

The solvent employable herein is not specifically restricted provided that it does not react with the isocyanate group, and for example, tetrahydrofuran, toluene, xylene, ethyl acetate or the like is employable.

After the reaction is completed, concentration in vacuum is carried out, whereby the desired NCO-terminated isocyanate prepolymer having an oxadiazinetrione skeleton and having NCO groups at the ends can be obtained.

The expression "having NCO groups at the ends" means that both end groups of the main skeleton of the NCO-terminated isocyanate prepolymer having an oxadiazientrione skeleton are NCO groups.

Process for Preparing End-blocked Isocyanate Prepolymer having Oxadiazine Ring The end-blocked isocyanate prepolymer having an oxadiazine ring according to the invention can be obtained by allowing the above NCO-terminated isocyanate prepolymer to react with the end-blocking agent (C) having at least one active hydrogen in the molecule substantially in the absence of a catalyst. The reaction can be carried out in the presence of a solvent.

By conducting the reaction without using a catalyst, ring-opening reaction of the oxadiazinetrione ring can be actually inhibited.

The solvent employable herein is not specifically restricted provided that it does not react with the isocyanate group, and for example, tetrahydrofuran, toluene, xylene, ethyl acetate or the like is employable.

It is desirable to use the end-blocking agent (C) in an amount of preferably 1 to 3 equivalents, more preferably 1.05 to 1.5 equivalents, based on the NCO group of the NCO-terminated isocyanate prepolymer. Although the temperature of the reaction of the NCO-terminated isocyanate prepolymer having an oxadiazinetrione skeleton with the end-blocking agent (C) is not specifically restricted, the reaction is carried out at a temperature of usually in the range of 5 to 150° C. After the reaction is completed, the excess end-blocking agent (C) is preferably removed or recovered under a reduced pressure.

After the reaction is completed, the reaction solution is introduced into a poor solvent such as hexane, whereby a white solid is obtained, or from the reaction solution the reaction solvent is removed under a reduced pressure and the remainder is dropped onto a chilled metallic plate, whereby a white solid can be obtained.

The thus obtained end-blocked isocyanate prepolymer having an oxadiazine ring according to the invention may contain, as a part of its structure, a uretdione structure, an isocyanurate structure, a carbodiimide structure, a biuret structure, a urea structure, a urethane structure, an allophanate structure or a uretnimine structure. The compound of the formula (1) and the compound of the formula (2), which are starting materials, may be a mixture.

In the end-blocked isocyanate prepolymer, at least one of isocyanate groups of the NCO-terminated isocyanate prepolymer, which comprises units derived from the oxadiazinetrione compound (A) represented by the formula (1) and units derived from the active hydrogen compound (B) represented by the formula (2), is blocked with a unit derived from the end-blocking agent (C) having at least one active hydrogen in one molecule, and it is preferable that all the terminal NCO groups of the NCO-terminated isocyanate prepolymer are blocked.

The molar ratio of the units derived from the active hydrogen compound (B) represented by the formula (2) to the units derived from the oxadiazinetrione compound (A) (units derived from (B)/units derived from (A)) is in the range of preferably 0.3 to 1.2, more preferably 0.5 to 1.0.

In case of the above ratio, the resulting end-blocked isocyanate prepolymer exhibits an appropriate softening point of not lower than 50° C., and therefore a cured product having excellent curing properties and film properties can be obtained.

When the softening point of the end-blocked isocyanate prepolymer having an oxadiazinetrione skelecton exceeds 50° C., excellent storage stability is exhibited, and the softening point is more preferably not lower than 60° C. Although the upper limit of the softening point is not specifically restricted, the softening point is preferably not higher than 180° C., more preferably not higher than 150° C.

Although there is no specific limitation on the number-average molecular weight of the end-blocked isocyanate prepolymer, the number-average molecular weight as measured by GPC using polystyrene as a standard sample is in the range of preferably 500 to 1,000,000, more preferably 800 to 50,000, particularly preferably 1,000 to 20,000.

Curing Agent for Surface Coating Material, Composition for Surface Coating Material, and uses Thereof The curing agent for a surface coating material according to the invention is a curing agent for a surface coating material, which contains the above-described end-blocked isocyanate prepolymer.

The composition for a surface coating material according to the invention is a composition or a mixture containing the end-blocked isocyanate prepolymer and a polymer having at least two hydroxyl groups in the molecule and optionally containing a catalyst, additives such as a stabilizer.

The composition for a surface coating material is stable for a long period of time at a storage temperature of room temperature and is a thermosetting composition that is cured when heated to a prescribed temperature. This composition is preferably used for a coating material, and is particularly preferably used for a powder coating material. When the composition is used for a coating material, a curing catalyst is particularly preferably used in order to cure the composition at a low temperature.

With regard to the blending ratio between the compound containing at least two active hydrogens and the end-blocked isocyanate prepolymer in the composition for a surface coating material, the equivalent ratio (active hydrogens in the compound having at least two active hydrogens)/(oxadiazinetrione rings in the end-blocked isocyanate prepolymer) is in the range of preferably 0.3 to 2, more preferably 0.5 to 1.2.

The composition for a surface coating material according to the invention preferably contains a curing catalyst. In this case, the curing catalyst is contained in an amount of preferably 0.01 to 5% by mass based on the composition for a surface coating material.

Polymer having two Hydroxyl Groups

As the polymer having two hydroxyl groups that is used for the composition for a surface coating material according to the invention, any active hydrogen compound is employable provided that it can react with the end-blocked isocyanate prepolymer of the invention to form a urethane resin.

Examples of the polymers having two hydroxyl groups include acrylic polyols, polyester polyols, polyether polyols, urethane polyols, epoxy polyols, fluoropolyols, polycarbonate polyols, polybutadiene polyols and the like.

Of these, polyester polyols are preferably employed.

The acrylic polyols are, for example, acrylic polyol resins obtained by copolymerizing polymerizable monomers having one or more active hydrogens in one molecule with other monomers copolymerizable therewith.

More specifically, there can be mentioned acrylic polyol resins obtained by polymerizing:

(a) at least one compound selected from the group consisting of active hydrogen-containing acrylic esters (e.g., 2-hydroxyethyl acrylate, 2-hydroxypropyl acrylate and 2-hydroxybutyl acrylate etc.), active hydrogen-containing methacrylic esters (e.g., 2-hydroxyethyl methacrylate, 2-hydroxypropyl methacrylate and 2-hydroxybutyl methacrylate etc.), acrylic monoesters or methacrylic monoesters of glycerol, and acrylic monoesters or methacrylic monoesters of trimethylolpropane, with (b) at least one compound selected from the group consisting of acrylic esters (e.g., methyl acrylate, ethyl acrylate, isopropyl acrylate, n-butyl acrylate and 2-ethylhexyl acrylate etc.) and methacrylic esters (e.g., methyl methacrylate, ethyl methacrylate, isopropyl methacrylate, n-butyl methacrylate, isobutyl methacrylate, n-hexyl methacrylate and lauryl methacrylate etc.), and/or (c) at least one compound selected from the group consisting of unsaturated carboxylic acids (e.g., acrylic acid, methacrylic acid, maleic acid and itaconic acid etc.), unsaturated amides (e.g., acrylamide, N-methylolacrylamide and diacetonacrylamide etc.) and other polymerizable monomers (e.g., glycidyl methacrylate, styrene, vinyltoluene, vinyl acetate and acrylonitrile etc.).

Also available are epoxy resins, such as those of novolak type, β-methylepichloro type, cyclic oxirane type, glycidyl ether type, glycidyl ester type, glycol ether type, epoxidized fatty acid unsaturated compound type, epoxidized fatty ester type, polycarboxylic ester type, aminoglycidyl type, halogenated type and resorcin type; monosaccharides or derivatives thereof, such as fruit sugar, grape sugar, sucrose, lactose and 2-methyl glycoxide; and aromatic or heterocyclic polyhydric alcohols, such as trimethylolbenzene and tris(2-hydroxyethyl) isocyanurate.

Examples of the polyester polyols include polyester polyol resins obtained by the condensation reaction of polycaprolactone polyol or dibasic acid (e.g., at least one compound selected from the group consisting of carboxylic acids, such as succinic acid, adipic acid, sebacic acid, dimeric acid, maleic anhydride, phthalic anhydride, isophthalic acid and terephthalic acid) with polyhydric alcohol (e.g., at least one compound selected from the group consisting of ethylene glycol, propylene glycol, diethylene glycol, dipropylene glycol, 1,4-butylene glycol, 1,3-butylene glycol, 1,6-hexamethylene glycol, neopentyl glycol, grycerol and trimethylolpropane etc.).

Examples of the polyether polyols include polyether polyols obtained by the addition of alkylene oxide (e.g., ethylene oxide, propylene oxide, 1,2-butylene oxide or tetrahydrofuran etc.) to at least one alcohol selected from polyhydric alcohols. More specifically, there can be mentioned polyethylene glycol, polypropylene glycol, polytetramethylene glycol and the like.

The fluoropolyol is, for example, fluoroolefin vinyl ether (trade name: Lumiflon, resin for coating material available from Asahi Glass Co., Ltd.).

The above polymers may be used as a mixture thereof, or they may be used in combination with another compound having two or more active hydrogens in one molecule. The compound having two or more active hydrogens in one molecule employable herein is, for example, at least one compound selected from primary or secondary amino group-containing compounds, substituted urea compounds, thiol group-containing compounds, carboxyl group-containing compounds, compounds containing different active hydrogen-containing groups in one molecule and the like.

Examples of the primary or secondary amino group-containing compounds include ethylenediamine, triethylenediamine, hexamethylenediamine, m-xylylenediamine, diaminodiphenylmethane, norbornanediamine, isophoronediamine, diethylenetriamine, polyamines obtained by the addition of alkylene oxides to various alkylenepolyamines, N,N'-dimethylethylenediamine and the like.

Examples of the substituted urea compounds include N,N'-dimethylurea, N-methyl-N'-cyclohexylurea and the like.

Examples of the thiol group-containing compounds include 1,2-ethanedithiol, 1,6-hexanedithiol, polyether polythiol, polyester polythiol and the like.

Examples of the carboxyl group-containing compounds include succinic acid, adipic acid, sebacic acid, terephthalic acid, carboxyl group-terminated polybutadiene and the like.

Examples of the compounds containing different active hydrogen-containing groups in one molecule include monoethanolamine, thioethanolamine, lactic acid, β-alanine and the like.

The compounds mentioned above can be used singly or in combination of plural kinds.

Catalyst used for the Composition for Surface Coating Material

The catalyst contained in the composition for a surface coating material is preferably at least one compound selected from the group consisting of salts of organic bases, metallic catalysts and imidazoles. By the use of such catalysts, the composition exhibits excellent heat stability in the preparation of a powder coating material (heat melting), in the storage thereof and before the curing stage, and besides the composition can be cured for a short period of time at a certain temperature or higher, so that such catalysts are preferable. Moreover, by changing the amount or the type of the catalyst, the curing rate can be controlled according to the curing temperature, and the necessary curing temperature or time can be determined according to the equipment or the purpose. These catalysts may be used singly or in combination of plural kinds.

Examples of basic components of the salts of organic bases include diazabicycloundecene (DBU), diazabicyclononene (DBN), diazabicyclooctene, trimethylamine, triethylamine, dimethylbenzylamine, triethylenediamine, tetramethylethylenediamine, pentamethyldiethylenetriamine, tetramethyldiaminoethyl ether and the like.

Examples of acid components of the salts of organic bases include carboxylic acids, such as carbonic acid, formic acid, acetic acid, propionic acid, benzoic acid, octylic acid, lauric acid and stearic acid; sulfonic acids, such as benzenesulfonic acid, p-toluenesulfonic acid, dodecylbenzenesulfonic acid and naphthalenesulfonic acid; phenols, such as phenol; and phosphoric acids, such as phosphoric acid, methyl phosphate and ethyl phosphate.

Examples of the metallic compounds include tin compounds, such as tin octylate, dibutyltin dilaurate, dibutyltin distearate, monobutyltin maleate, dioctyltin meleate, dibutyltin fatty acid oxide (trade name: SCAT-1) dibutyltin fatty acid salt (trade name: SCAT-2L), dibutyltin bismaleic acid alkyl ester salt (trade name: SCAT-4A), dibutyltin mercapto ester, dibutyltin acetate (trade name: SCAT-8) and dibutyltin bisacetylacetonato (trade name: SCAT-25); bismuth compounds, such as bismuth tris(2-ethylhexanoate); titanium compounds, such as titanium tetra(ethylhexanoate); iron compounds, such as iron chloride and iron octylate; cobalt compounds, such as cobalt bis(ethylhexanoate); zinc compounds, such as zinc chloride; nickel compounds; zirconium compounds and the like. Mixtures of these compounds are also available.

Examples of the imidazoles include 1-isobutyl-2-methylimidazole, 1-benzyl-2-methylimidazole, 1-benzyl-2-phenylimidazole and the like.

Other Additives

To the composition for a powder coating material according to the invention, there can be added various additives used in the technical fields concerned, for example, resins, such as epoxy resin, polyester resin and acrylic resin, inorganic or organic pigments, such as titanium dioxide, carbon black and phthalocyanine type pigment, coloring assistants, leveling agents, antioxidants, ultraviolet light absorbers, antistatic agents, flame retardants, plasticizers, anti-foaming agents, surface active agents, antistatic agents and the like.

Process for Preparing Surface Coating Material

The surface coating material is prepared in a melt kneading machine such as a heating roll or a kneader. The composition for a surface coating material according to the invention that contains the above additives is pretreated, when needed, and then the composition is subjected to melting, kneading, and after cooling, pulverization and classification to prepare the surface coating material.

Uses

The composition for a surface coating material according to the invention is favorable for a coating material such as a surface coating material, particularly a powder coating material. That is to say, the curing agent for a powder coating material according to the invention contains the end-blocked isocyanate prepolymer, and the composition for a powder coating material according to the invention contains the end-blocked isocyanate prepolymer and the polymer having at least two hydroxyl groups in the molecule.

Although there is no specific limitation on the surface coating method, the object is coated with the composition of the invention by, for example, electrostatic coating, fluidized bed coating or the like. The thickness of the coating film is appropriately selected according to the necessity.

Although the conditions to cure the resulting coated product can be appropriately determined, the coated product is usually baked at a temperature of 130 to 200° C. for 5 to 60 minutes and thereby cured.

When the resin composition for a coating material according to the invention is used as a powder coating material, the powder coating material exhibits excellent adhesion to the substrates to be coated, such as metals, plastics and ceramics. Therefore, the powder coating material of the invention can be widely used as a coating material for electric appliances, vehicles, equipments, building materials, etc.

EXAMPLES

The present invention is further described with reference to the following examples, but it should be construed that the invention is in no way limited to those examples.

In the following examples, the symbol "%" means "% by mass (wt %)". The analytical values and the film properties in the examples were measured and evaluated in the following manner. In the examples, the compounds are abbreviated as follows.

NBDI: norbornane diisocyanate
HDI: hexamethylene diisocyanate
XDI: xylylene diisocyanate
MeOH: methanol
BuOH: butanol
EHOH: ethylhexyl alcohol
EG: ethylene glycol
BG: 1,4-butanediol
PD: 1,5-pentanediol
HG: 1,6-hexanediol Measuring Methods
Number-average Molecular Weight of Prepolymer The number-average molecular weight was measured by GPC (gel permeation chromatography). The measurement was carried out using Shodex KF-804L under the conditions of a mobile phase of THF, a flow rate of 1 ml/min and a column temperature of 40° C. The weight-average molecular weight was calculated using polystyrene as a standard sample.

Film Tests

The film tests were carried out under the conditions of 20° C./60%RH, and the evaluations were carried out in accordance with JIS K-5400. The test methods for the items (1) to (6) shown in the tables are as follows.

(1) Appearance

The appearance and the smoothness were evaluated by visual observation.

E: extremely good, G: good, F: flat, B: bad (2) Gloss (60° gloss)

The gloss was evaluated in accordance with JIS K-5400.

(3) Pencil hardness

The pencil hardness was evaluated in accordance with JIS K-5400.

(4) Erichsen extrusion

The Erichsen extrudion was evaluated in accordance with JIS Z-2247.

(5) Du Pont impact (½ in/500 g)

The Du Pont impact was evaluated in accordance with JIS K-5400.

(6) Adhesion

The adhesion was evaluated in accordance with JIS D-0202.

Preparation of End-blocked Isocyanate Prepolymer Synthesis Example 1-1

Preparation of Oxadiazinetrione Compound

In 9 g of butyl acetate, 1 g of tri-n-butylphosphine was dissolved to prepare a catalyst solution.

In a four-necked flask equipped with a thermometer, a cooling tube, a nitrogen inlet and a stirrer, 1000 g (4.85 mol) of NBDI (available from Mitsui Chemicals, Inc.) was placed, then 10 g of the above catalyst solution was added with blowing a carbon dioxide gas at a rate of 200 ml/min at 25° C., and the reaction was carried out for 10 hours with stirring.

As a result, the NCO content in the reaction solution was decreased down to 35.9% from 40.7%. To the reaction solution, 1.2 g of dibutyl phosphate was added, and the mixture was stirred for further 0.5 hour. Then, feed of the carbon dioxide gas was stopped. Thus, a colorless transparent liquid was obtained. The reaction mass thus obtained was subjected to thin film distillation under a reduced pressure of 0.2 torr, and the unreacted starting materials were removed to obtain 210 g of an organic polyisocyanate compound having an oxadiazinetrione structure.

Appearance: transparent solid
NCO content (%): 17.2%

A part of the solution was allowed to react with methyl alcohol to obtain a methyl carbamate compound. The multimer component proportions in the compound as measured by gel permeation chromatography (referred to as "GPC" hereinafter) are as follows.

n=1: 85.5%
n=2 or greater: 14.5%
Average n=1.1

Synthesis Example 1-2

Preparation of NCO-terminated Isocyanate Prepolymer

In a four-necked flask equipped with a thermometer, a cooling tube, a nitrogen inlet and a stirrer, 130 g of the oxadiazinetrione compound obtained in Synthesis Example 1-1, 11 g of 1,4-butanediol and 200 ml of methyl ethyl ketone were placed and dissolved to give a solution. The solution was stirred at 80° C. until the NCO % became 3% through titration. After the reaction of 7 hours, when the prescribed NCO content (%) was reached, the reaction was completed. Thereafter, the reaction solution was introduced into hexane to obtain 128 g of an isocyanate prepolymer having an oxadiazine ring.

Synthesis Examples 1-3

Preparation of End-blocked Isocyanate Prepolymer

In a four-necked flask equipped with a thermometer, a cooling tube, a nitrogen inlet and a stirrer, 100 g of the NCO-terminated isocyanate prepolymer having an oxadiazine ring obtained in Synthesis Example 1-2, 22 g of 2-ethylhexanol and 200 ml of methyl ethyl ketone were placed and dissolved to give a solution. The temperature of the system was raised with stirring. The reaction was continued at 80° C. for 10 hours until no NCO group was detected by IR. After the reaction was completed, the system was cooled, then the reaction solution was introduced into hexane, and the crystals precipitated were collected by filtration.

The number-average molecular weight (GPC) of the resulting end-blocked isocyanate prepolymer was 3947 (in terms of polystyrene).

Synthesis Examples 2 to 6

An end-blocked isocyanate prepolymer having an oxadiazine ring was prepared in the same manner as in Synthesis Example 1 (Synthesis Examples 1-1 to 1-3), except that the kinds of the starting materials and the blending quantity were changed as shown in Table 1.

TABLE 1

| Synthesis Example No. | Synthesis Ex. 1 | Synthesis Ex. 2 | Synthesis Ex. 3 | Synthesis Ex. 4 | Synthesis Ex. 5 | Synthesis Ex. 6 |
|---|---|---|---|---|---|---|
| Starting isocyanate | NBDI | NBDI | NBDI | NBDI:HD I = 3:1 | NBDI:HD I = 4:1 | XDI |
| Glycol | BG | EG | HG | PD | BG | BG |
| Blocking agent | ETOH | MeOH | ETOH | BtOH | ETOH | MeOH |
| Number-average molecular weight | 3947 | 2293 | 4994 | 3540 | 4120 | 4588 |
| Softening point | 78 | 67 | 85 | 74 | 76 | 87 |

Measurement of Softening Point

The softening point was measured under the following conditions using a Shimadzu Flow Tester CFT-500 (manufactured by Shimadzu Seisakusho, Ltd.).

Starting temperature: 50° C.

Heating rate: 6° C./min

Cylinder pressure: 20 kgf/cm$^2$

Examples 1 to 7

Preparation of Resin Composition for Powder Coating Material

The end-blocked isocyanate prepolymers (starting curing agents) obtained in Synthesis Examples 1 to 6 were each used. The isocyanate prepolymer and other materials shown in Table 2 were homogeneously mixed in the blending ratio shown in Table 2 by the use of a Mitsui Henschel Mixer (trade name, manufactured by Mitsui Mining Co., Ltd.), and then the mixture was melt kneaded by a kneading machine (Extruder PCM-30, manufacture by Ikegai Corp.) at a temperature of 100 to 130° C. After cooling, the resulting kneadate was pulverized by a pulverizer (sample mill, manufactured by Fuji Paudal Co., Ltd.) and then subjected to 150-mesh filtration to obtain a homogeneous powder coating material.

The resulting powder coating material was applied onto a zinc phosphate-treated iron plate by an electrostatic coating machine (manufactured by Nihon Parkerizing Co., Ltd.) in such a manner that the film thickness would become 50 to 60 μm and then baked by an electric hot-air oven at 180° C. for 20 minutes to cure the film. Then, the properties of the resulting coating film were evaluated. The results are set forth in Table 4.

TABLE 2

| Example No. | Ex. 1 Synthesis | Ex. 2 Synthesis | Ex. 3 Synthesis | Ex. 4 Synthesis | Ex. 5 Synthesis | Ex. 6 Synthesis |
|---|---|---|---|---|---|---|
| Curing agent | Ex. 1 | Ex. 1 | Ex. 2 | Ex. 3 | Ex. 4 | Ex. 5 |
| Amount of curing agent | 53.5 | 33.5 | 53.5 | 53.5 | 43.5 | 43.5 |
| Polyester resin | 77.2 | 96.6 | 77.2 | 77.2 | 85.5 | 85.5 |
| Titanium oxide | 65.4 | 65.1 | 65.4 | 65.4 | 65 | 65 |
| Benzoin | 0.8 | 1 | 0.8 | 0.8 | 0.8 | 0.8 |
| Leveling agent | 0.8 | 1 | 0.8 | 0.8 | 0.8 | 0.8 |
| Epoxy resin | 1.5 | 1.9 | 1.5 | 1.5 | 1.5 | 1.5 |
| Catalyst | DBTDL | DBTDL | DBUp–TsOH salt | iron chloride | R-2000 | 1B2MZ |
| Catalyst amount | 0.8 | 1 | 0.8 | 0.8 | 0.2 | 0.2 |

Comparative Examples 1 and 2

A resin composition for a powder coating material was prepared in the same manner as in Example 1, except that the compounding was changed as shown in Table 3.

TABLE 3

| Comparative Example | Comp. Ex. 1 | Comp. Ex. 2 | Comp. Ex. 3 |
|---|---|---|---|
| Curing agent | Synthesis Ex. 1 | BF-1540 | Synthesis Ex. 2 |
| Amount of curing agent | 53.5 | 22.1 | 53.5 |
| Polyester resin | 77.2 | 111.7 | 77.2 |
| Titanium oxide | 65.4 | 65.1 | 65.4 |
| Beozoin | 0.8 | 1.1 | 0.8 |
| Leveling agent | 0.8 | 1.1 | 0.8 |
| Epoxy resin | 1.5 | 2.2 | 1.5 |
| Catalyst | — | DBTDL | DBU |
| Catalyst amount | — | 0.3 | 0.8 |

The meanings of the symbols in Tables 2 and 3 are as follows.

DBUp-TsOH salt: diazabicycloundecene p-toluenesulfonate

DBTDL: dibutyltin dilaurate

R-2000: 1-isocyanate butyl-2-methylimidazole (available from Sankyo Air Products Co., Ltd.)

1B2MZ: 1-benzyl-2-methylimidazole

Polyester resin: GV-150 (OHV: 33.6 mgKOH/g, available from Japan U-Pica Co., Ltd.)

Epoxy resin: Epicoat 1004 (available from Yuka-Shell Epoxy Co., Ltd.)

BF-1540 (available from Creanova Inc.)

Comparative Example 3

The procedure of Example 3 was repeated except that the catalyst was changed from the DBUp-TsOH salt to DBU. As a result, the reaction proceeded in the kneading stage of the process for preparing a powder coating material, and therefore a powder coating material could not be obtained.

TABLE 4

|  | Ex. 1 | Ex. 2 | Ex. 3 | Ex. 4 | Ex. 5 | Ex. 6 |
|---|---|---|---|---|---|---|
| Film appearance | E | E | E | E | E | E |
| 60° gloss | 96 | 97 | 95 | 94 | 94 | 94 |
| Pencil hardness | H | 2H | H | H | H | H |
| Erichsen extrusion | >7 | >7 | >7 | >7 | >7 | >7 |
| Du Pont impact | >50 | >50 | >50 | >50 | >50 | >50 |
| Cross-cut adhesion | 100 | 100 | 100 | 100 | 100 | 100 |

TABLE 5

|  | Comp. Ex. 1 | Comp. Ex. 2 |
|---|---|---|
| Film appearance | G | F |
| 60° gloss | 88 | 85 |
| Pencil hardness | 2B | 3B |
| Erichsen extrusion | 5.5 | >7 |
| Du Pont impact | 45 | >50 |

As can be seen from Tables 4 and 5 as well as the evaluation results of Examples 1 to 6, the isocyanate prepolymers of the invention are superior, as the curing agents for coating materials, to the conventional environmentally low-burdening blocked polyisocyanates (uretdione type) in the curing properties and the film properties.

INDUSTRIAL APPLICABILITY

As described above, the present invention provides a novel end-blocked isocyanate prepolymer having an oxadiazine ring. The end-blocked isocyanate prepolymer having an oxadiazine ring can remarkably decrease the quantity of VOC released when a powder coating material or the like is cured. Especially in the use of a curing oven, the burden on the curing oven can be reduced, whereby a life of the curing oven can be extended and the maintenance cost can be decreased. Further, there can be provided a thermosetting composition favorable for a surface coating material, such as a powder coating material, which is stable when stored at room temperature and is capable of being cured at low temperatures.

By appropriately determining a combination of the catalyst and the active hydrogen compound and the quantity ratio therebetween, the curing temperature can be controlled, and hence a curing composition suited to the purpose or the conditions can be prepared.

The curing agent obtained can provide a powder coating material which can be prepared at a low cost and has a novel crosslinked form.

What is claimed is:

1. An end-blocked isocyanate prepolymer having an oxadiazine ring, wherein at least one of isocyanate groups of a NCO-terminated isocyanate prepolymer, which has NCO groups at the ends and comprises units derived from an oxadiazinetrione compound (A) represented by the following formula (1) and units derived from an active hydrogen compound (3) represented by the following formula (2), is blocked with a unit derived from an end-blocking agent (C) having at least one active hydrogen in one molecule, said end-blocked isocyanate prepolymer having a softening point of not lower than 50° C.,

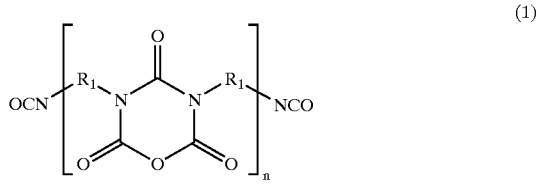

(1)

wherein $R_1$ is a group selected from the group consisting of an aliphatic hydrocarbon group of 2 to 20 carbon atoms, an aliphatic hydrocarbon group having an aromatic group and an alicyclic hydrocarbon group, and n is an integer of 1 or greater, $$H-A-R_2-A-H \quad (2)$$

wherein $R_2$ is a straight-chain, branched or cyclic alkylene group of 2 to 12 carbon atoms, and A is any one of an oxygen atom, a sulfur atom, a N—R' group (R' is a hydrogen atom, an alkyl group, an aryl group or an aralkyl group) and a COO group.

2. An end-blocked isocyanate prepolymer having an oxadiazine ring, which is obtained by allowing a NCO-terminated isocyanate prepolymer baiting NCO groups at the ends to react with an end-blocking agent (C) having at least one active hydrogen in one molecule, said NCO-terminated isocyanate prepolymer being obtained by allowing an oxadiazinetrione compound (A) represented by the following formula (1) to react with an active hydrogen compound (8) represented by the following formula (2), wherein at least one of isocyanate groups of the NCO-terminated isocyanate prepolymer is blocked with the end-blocking agent (C), said end-blocked isocyanate prepolymer having a softening point of not lower than 50° C.,

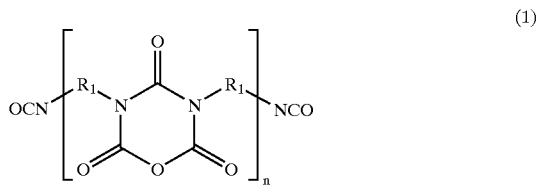

(1)

wherein $R_1$ is a group selected from the group consisting of an aliphatic hydrocarbon group of 2 to 20 carbon atoms, an aliphatic hydrocarbon group having an aromatic group and an alicyclic hydrocarbon group, and n is an integer of 1 or greater, $$H-A-R_2-A-H \quad (2)$$

wherein $R_2$ is a straight-chain, branched or cyclic alkylene group of 2 to 12 carbon atoms, and A is any one of an oxygen atom, a sulfur atom, a N—R' group (R' is a hydrogen atom, an alkyl group, an aryl group or an aralkyl group) and a COO group.

3. The end-blocked isocyanate prepolymer as claimed in claim 1, wherein the end-blocking agent (C) having active hydrogen is at least one compound selected from the group consisting of oximes, amides, imides, active methylene compounds, amines, azoles, alcohols, phenols and thiols.

4. The end-blocked isocyanate prepolymer as claimed in claim 2, wherein the end-blocking agent (C) having active hydrogen is at least one compound selected from the group consisting of oximes, amides, imides, active methylene compounds, amines, azoles, alcohols, phenols and thiols.

5. The end-blocked isocyanate prepolymer having an oxadiazine ring as claimed in claim 1, partially containing, in its molecule, at least one skeleton selected from a uretdione structure, an isocyanurate structure, a carbodiimide structure, a biuret structure, a urea structure, a urethane structure, an allophanate structure and a uretnimine structure.

6. The end-blocked isocyanate prepolymer having an oxadiazine ring as claimed in claim 2, partially containing, in its molecule, at least one skeleton selected from a uretdione structure, an isocyanurate structure, a carbodiimide structure, a biuret structure, a urea structure, a urethane structure, am allophanate structure and a uretnimine structure.

7. A curing agent for a surface coating material, containing the end-blocked isocyanate prepolymer of claim 1.

8. A curing agent for a surface coating material, containing the end-blocked isocyanate prepolymer of claim 2.

9. A curing agent for a powder coating material, containing the end-blocked isocyanate prepolymer of claim 1.

10. A curing agent for a powder coating material, containing the end-blocked isocyanate prepolymer of claim 2.

11. A composition for a surface coating material, containing the end-blocked isocyanate prepolymer of claim 1 and a polymer having at least two hydroxyl groups in the molecule.

12. A composition for a surface coating material, containing the end-blocked isocyanate prepolymer of claim 2 and a polymer having at least two hydroxyl groups in the molecule.

13. The composition for a surface coating material as claimed in claim 11, wherein the polymer having hydroxyl groups is at least one polyol selected from the group consisting of acrylic polyols, polyester polyols, polyether polyols, urethane polyols, epoxy polyols and polycarbonate polyols.

14. A composition for a powder coating material, containing the end-blocked isocyanate prepolymer of claim 1 and a polymer having at least two hydroxyl groups in the molecule.

15. A composition for a powder coating material, containing the end-blocked isocyanate prepolymer of claim 2 and a polymer having as least two hydroxyl groups in the molecule.

16. The composition for a powder coning material as claimed in claim 14, wherein the polymer having hydroxyl groups is at least one polyol selected from the group consisting of acrylic polyols, polyester polyols, polyether polyols, urethane polyols, epoxy polyols and polycarbonate polyols.

17. The composition for a surface coating material as claimed in claim 13, containing as a curing catalyst at least one compound selected from the group consisting of metallic compounds, salts of organic bases and imidazoles.

18. The composition for a powder coating material as claimed in claim 16, containing as a curing catalyst at least one compound selected from the group consisting of metallic compounds, salts of organic bases and imidazoles.

19. A process for preparing an end-blocked isocyanate prepolymer, comprising allowing a NCO-terminated isocyanate prepolymer having NCO groups at the ends to react with an end-blocking agent (C) having at least one active hydrogen in one molecule substantially in the absence of a catalyst, said NCO-terminated isocyanate prepolymer being obtained by allowing an oxadiazinetrione compound (A) represented by the following formula (1) to react with an active hydrogen compound (B) represented by the following formula (2) substantially in the absence of a catalyst, to obtain an end-blocked isocyanate prepolymer wherein at least one of isocyanate groups of the NCO-terminated isocyanate prepolymer is blocked with the end-blocking agent (C), said end-blocked isocyanate prepolymer having a softening point of not lower than 50° C.,

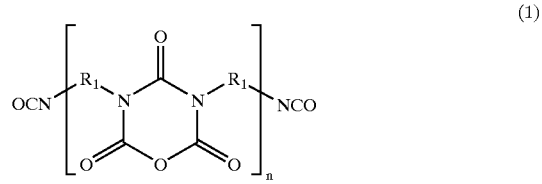
(1)

wherein $R_1$ is a group selected from the group consisting of an aliphatic hydrocarbon group of 2 to 20 carbon atoms, an aliphatic hydrocarbon group having an aromatic group and an alicyclic hydrocarbon group, and n is an integer of 1 or greater,

(2)

wherein $R_2$ is a straight-chain, branched or cyclic alkylene group of 2 to 12 carbon atoms, and A is any one of an oxygen atom, a sulfur atom, a N—R' group (R' is a hydrogen atom, an alkyl group, an aryl group or an aralkyl group) and a COO group.

20. The process for preparing an end-blocked isocyanate prepolymer as claimed in claim 19, wherein the oxadiazinetrione compound (A) represented by the formula (1) is a compound obtained by allowing at least one diisocyanate selected from the group consisting of norbornane diisocyanate (NBDI), hydrogenated xylylene diisocyanate (hydrogenated XDI), xylylene diisocyanate (XDI), hexamethylene diisocyanate (HDI), tricyclodecane diisocyanatomethyl (TCDI), isophorone diisocyanate (IPDI), hydrogenated MDI and cyclohexane diisocyanate (CHDI) to react with carbon dioxide.

* * * * *